Figure 4:
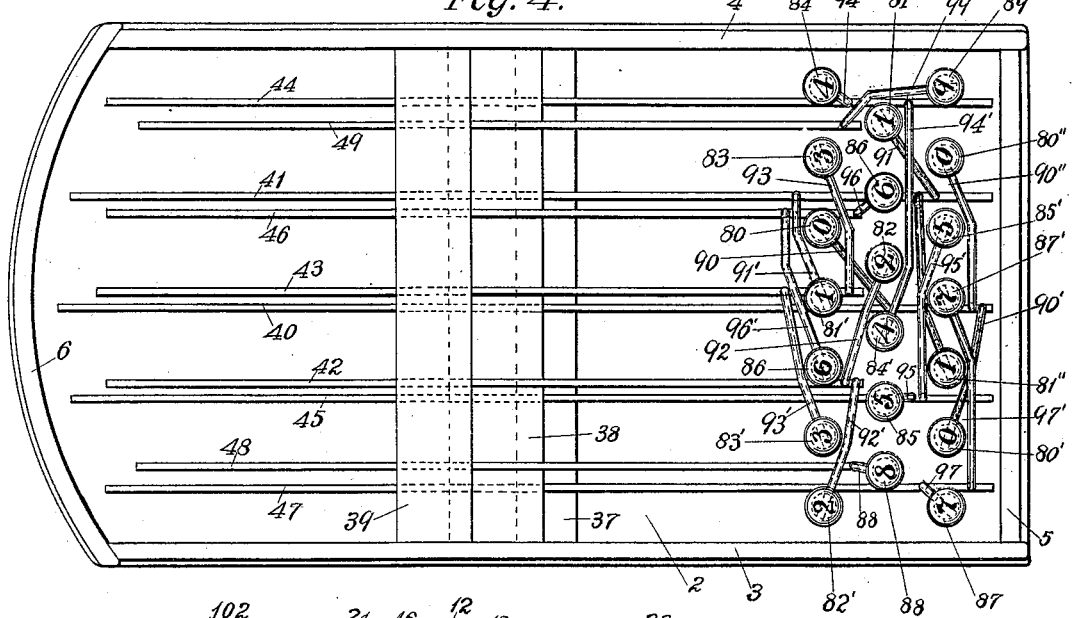

(No Model.)  
6 Sheets—Sheet 1.
F. H. RICHARDS.
TYPE WRITING MACHINE.
No. 403,216.  Patented May 14, 1889.
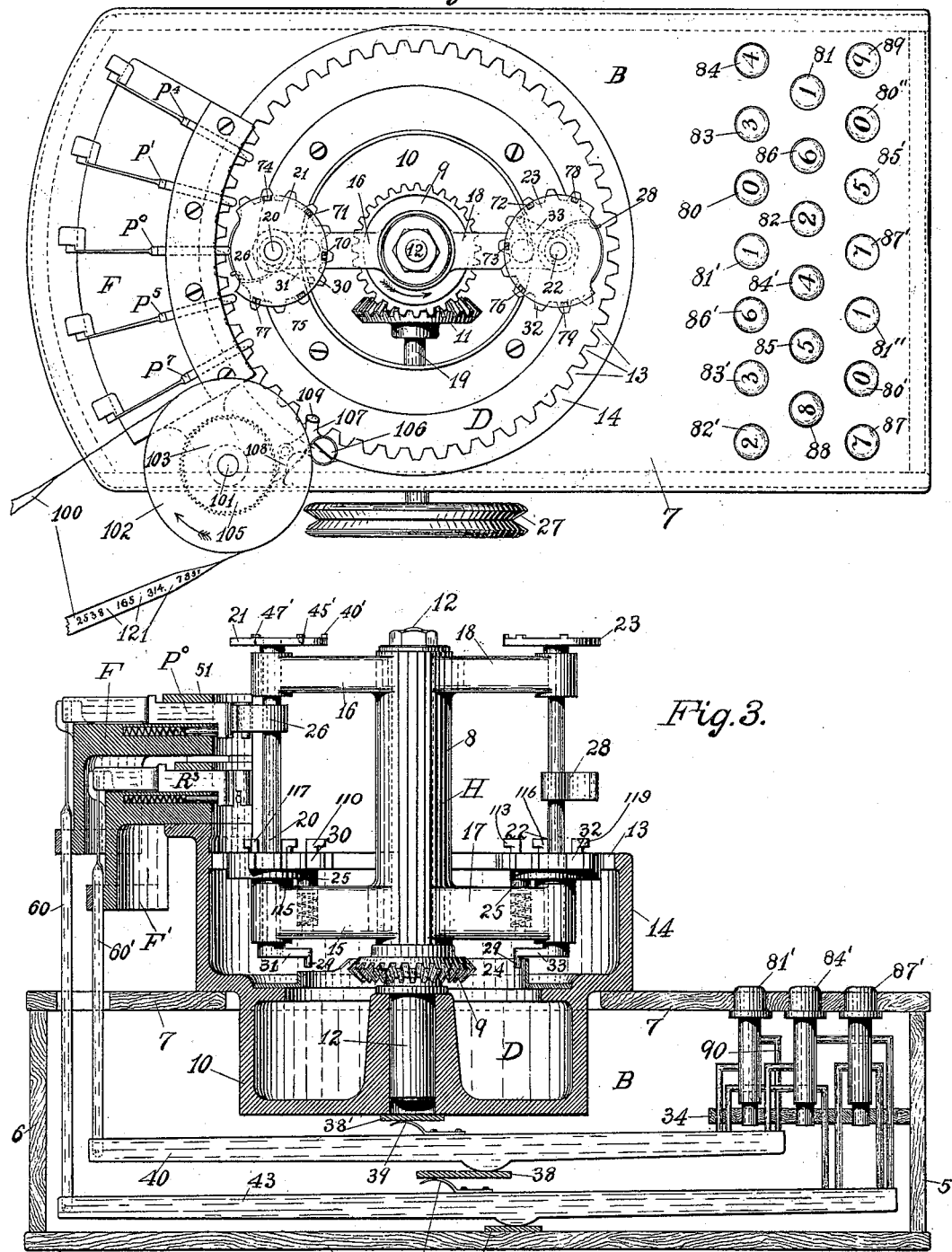
Witnesses:  
Wilbur M. Stone.  
Darien W. Dodson.
Inventor:  
Francis H. Richards.

(No Model.) 6 Sheets—Sheet 2.

F. H. RICHARDS.
TYPE WRITING MACHINE.

No. 403,216. Patented May 14, 1889.

Witnesses:
Wilbur M. Stone
Darius W. Dodson

Inventor:
Francis H. Richards (No Model.) 6 Sheets—Sheet 3.
F. H. RICHARDS.
TYPE WRITING MACHINE.
No. 403,216. Patented May 14, 1889.
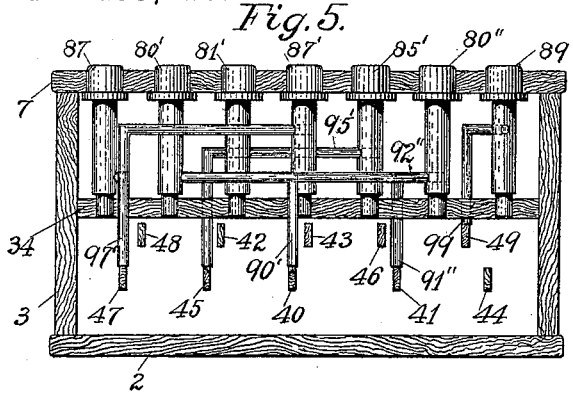
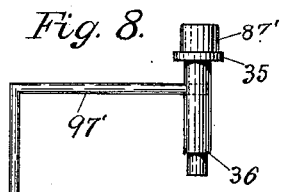
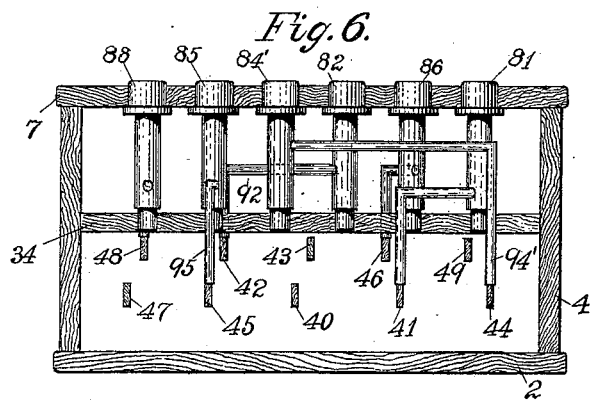
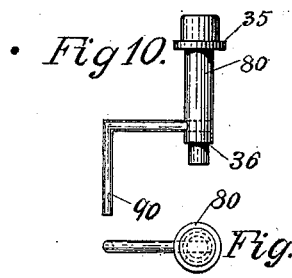
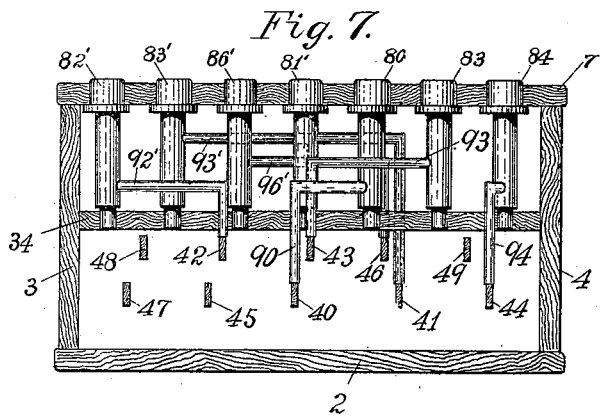
Witnesses:
Wilbur M. Stone.
Darwin W. Dodson.
Inventor:
Francis H. Richards.

(No Model.)  6 Sheets—Sheet 4.
F. H. RICHARDS.
TYPE WRITING MACHINE.
No. 403,216.   Patented May 14, 1889.
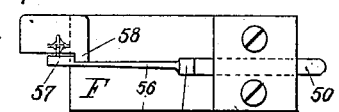
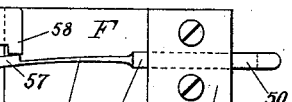
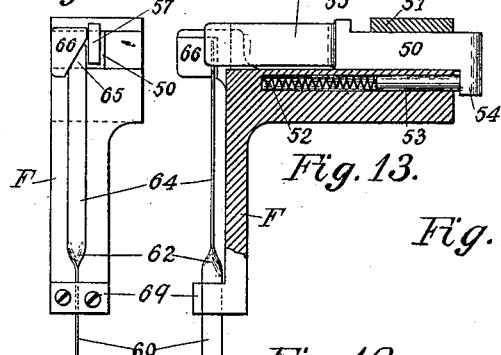
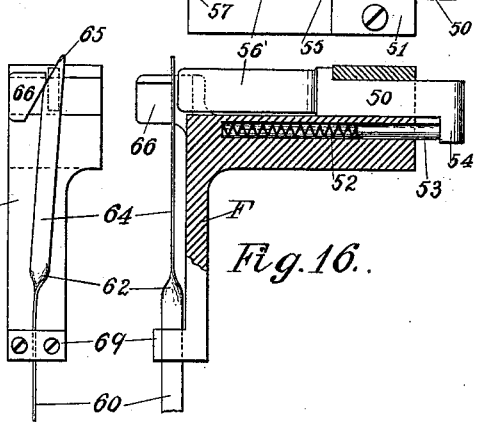
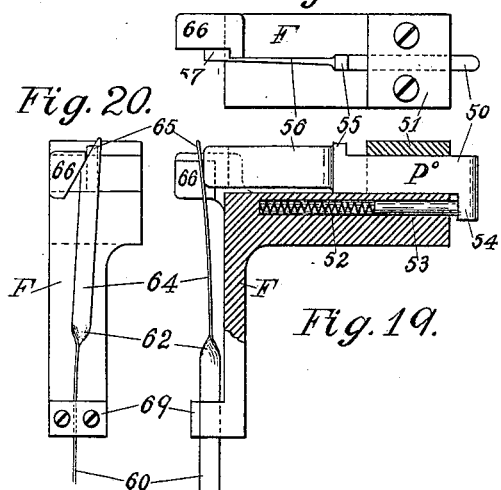
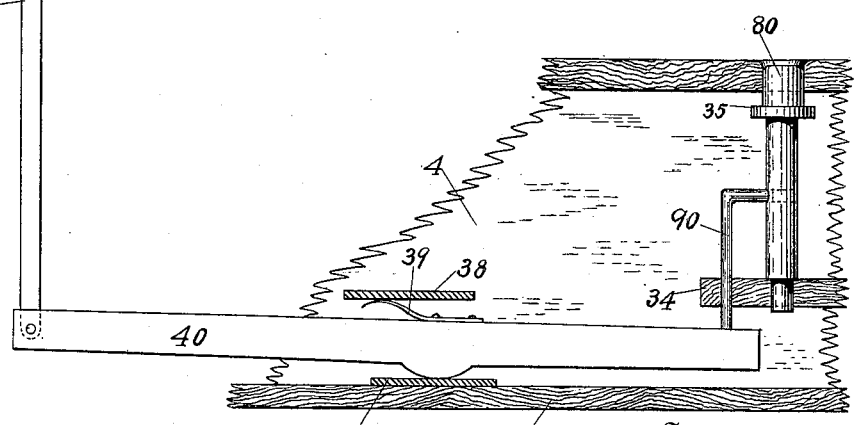
Witnesses:
Wilbur M. Stone.
Darius W. Dodson
Inventor:
Francis H. Richards (No Model.) 6 Sheets—Sheet 5.

F. H. RICHARDS.
TYPE WRITING MACHINE.

No. 403,216. Patented May 14, 1889.

Witnesses:
Wilbur M. Stone
Darwin W. Dodson

Inventor:
Francis H. Richards (No Model.)

F. H. RICHARDS.
TYPE WRITING MACHINE.

No. 403,216. Patented May 14, 1889.

Fig. 25.
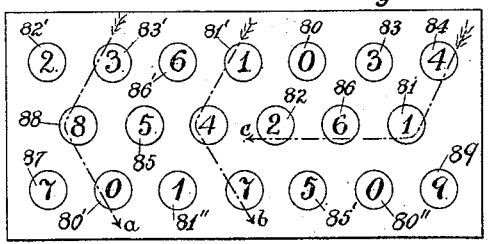

Fig. 26.
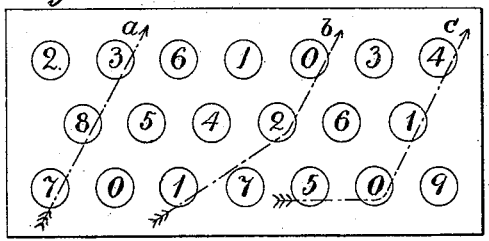

Fig. 27.
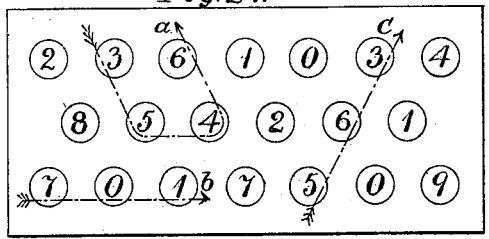

Fig. 28.
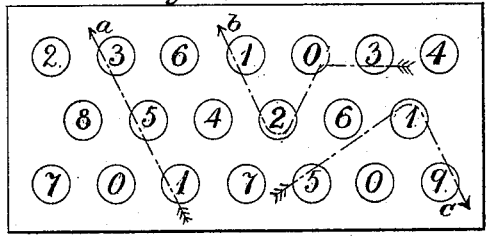

Fig. 29.
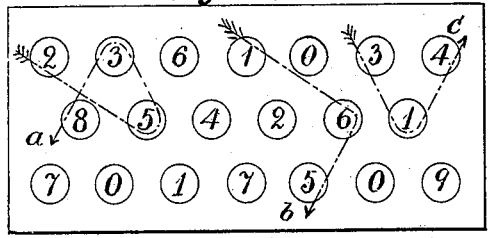

Fig. 30.
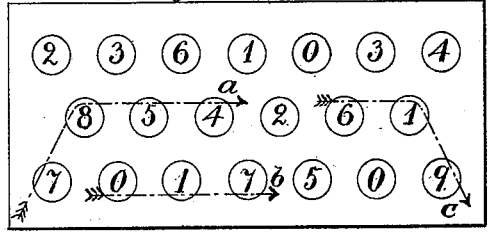

Fig. 31.
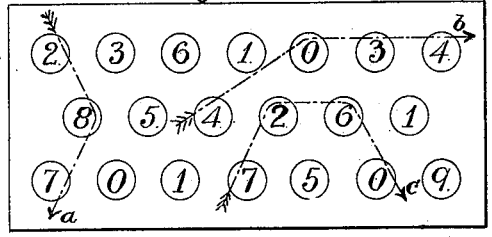

Fig. 32.
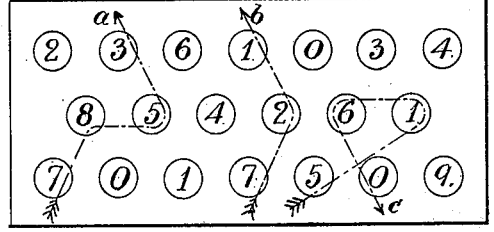

Fig. 33.   Table of Finger-Strokes.

| Fig. 25. | Fig. 27. | Fig. 29. | Fig. 31. |
|---|---|---|---|
| Stroke "a" = 380 | Stroke "a" = 3546 | Stroke "a" = 2538 | Stroke "a" = 287 |
| " "b" = 147 | " "b" = 701 | " "b" = 165 | " "b" = 4034 |
| " "c" = 2614 | " "c" = 563 | " "c" = 314 | " "c" = 7260 |

| Fig. 26. | Fig. 28. | Fig. 30. | Fig. 32. |
|---|---|---|---|
| Stroke "a" = 783 | Stroke "a" = 153 | Stroke "a" = 7854 | Stroke "a" = 7853 |
| " "b" = 120 | " "b" = 3021 | " "b" = 017 | " "b" = 721 |
| " "c" = 5014 | " "c" = 519 | " "c" = 619 | " "c" = 5160 |

Witnesses:
Wilbur M. Stone.
Darien W. Dodson.

Inventor:
Francis H. Richards.

UNITED STATES PATENT OFFICE.

FRANCIS H. RICHARDS, OF SPRINGFIELD, MASSACHUSETTS, ASSIGNOR TO DARIEN W. DODSON, OF WILKES-BARRÉ, PENNSYLVANIA.

TYPE-WRITING MACHINE.

SPECIFICATION forming part of Letters Patent No. 403,216, dated May 14, 1889.

Application filed November 24, 1886. Serial No. 219,764. (No model.)

*To all whom it may concern:*

Be it known that I, FRANCIS H. RICHARDS, a citizen of the United States, residing at Springfield, in the county of Hampden and State of Massachusetts, have invented certain new and useful Improvements in Type-Writing Machines, of which the following is a specification.

This invention relates to that class of typewriters in which the printing is done by typewheels having an orbital movement, and it is in the nature of an improvement on the type-writer of that class patented to D. W. Dodson June 3, 1884, and numbered 299,754.

The invention is applicable to machines for printing in letters or other characters; and in the accompanying drawings, forming a part of this specification, it is shown embodied in a machine for printing the ten characters known as "Arabic numerals."

Figure 2:
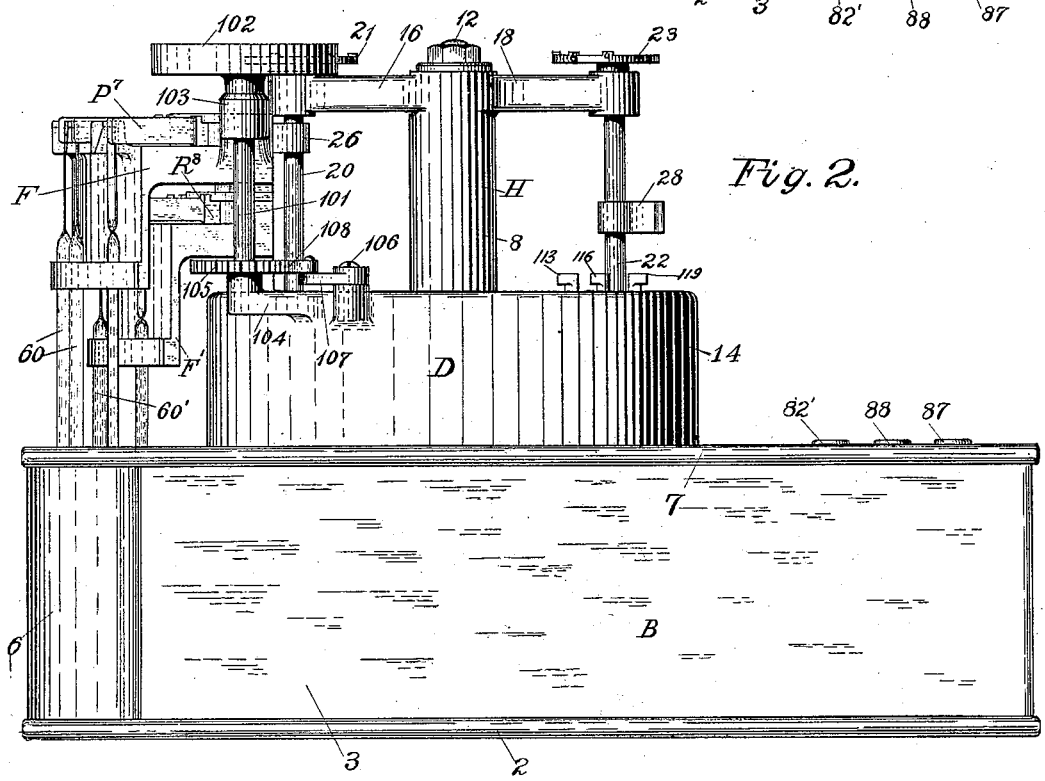
Figure 21:
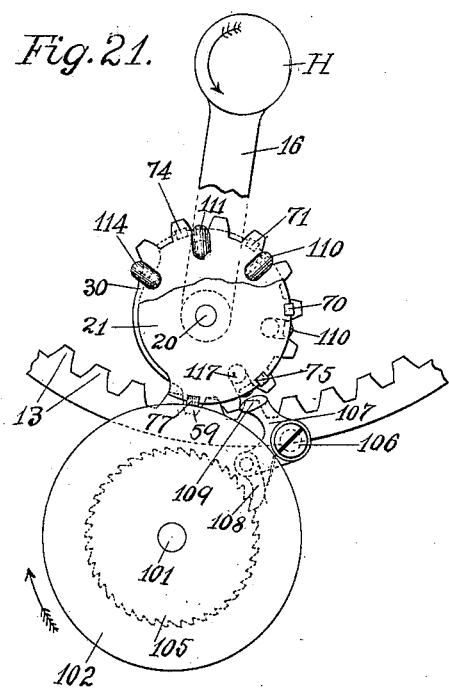
Figure 22:
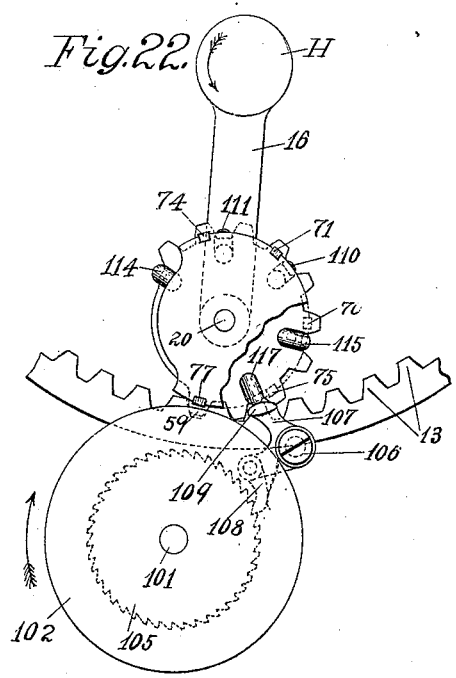

Figure 1 is a plan or top view of the machine. Fig. 2 is a side elevation of the same. Fig. 3 is a sectional side elevation. Fig. 4 is a plan view of the system of keys and key-levers. Fig. 5 is a front view (from the right hand in Figs. 1, 2, 3, and 4) of the front or first row of keys. Fig. 6 is a similar view of the second row of keys. Fig. 7 is a similar view of the third row of keys. Fig. 8 is a front view, and Fig. 9 a top view, of the central key, 87', of the front row of keys. Figs. 10 and 11 are two similar views of the key 80 in Fig. 7 of the third row of keys. Figs. 12, 13, and 14 are respectively a top view, a sectional side elevation, and a rear elevation (all drawn to an enlarged scale) of the latch mechanism in its normal position—that is, set ready for use. Figs. 15, 16, and 17 are three similar views of this mechanism, showing the parts as situated at the moment after the latch has been unhooked. Figs. 18, 19, and 20 are three similar views showing the parts as situated after the latch has been reset, but before the return of the tripping-rod. Fig. 19 includes, also, one of the keys and key-levers connected with the tripping-rod for operating the same. Fig. 21 is an enlarged top view illustrating the operation of printing the first character on one of the type-wheels. Fig. 22 is a similar view illustrating the feeding of the paper after the printing of said character.

Figure 23:
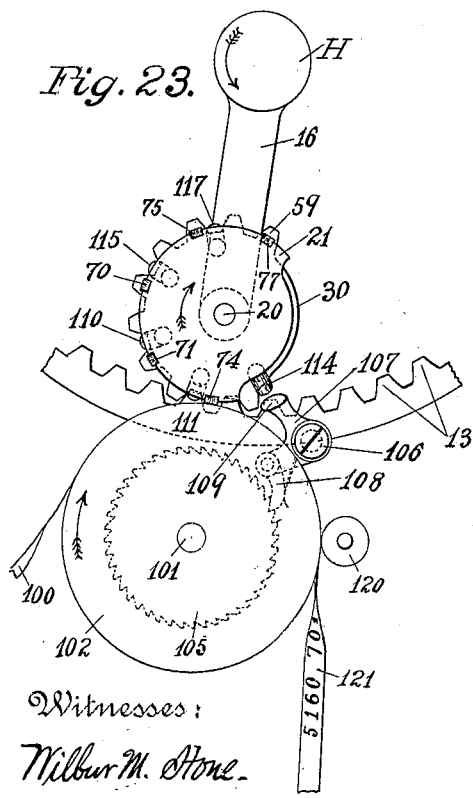
Figure 24:
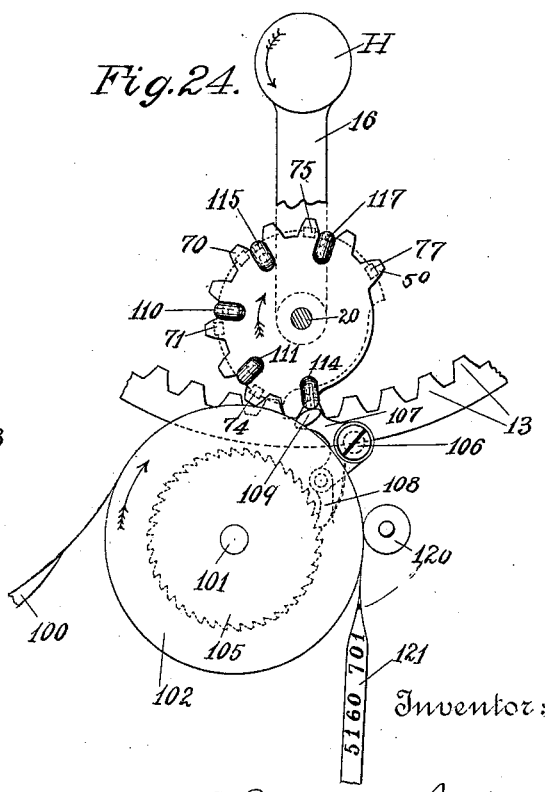

Fig. 23 is a view similar to Fig. 21, illustrating the printing of the last character on said typewheel. Fig. 24 is a view similar to Fig. 22, illustrating the feeding of the paper after the last printing operation. Figs. 25 to 32, inclusive, are duplicate views or diagrams of the key-board, illustrating the duplication of keys and some of the combinations of keys which may be operated by a single finger-stroke. Fig. 33 is a table of the finger-strokes indicated on said diagrams and of the corresponding numbers printed.

Similar characters designate like parts in all the figures.

The machine comprises a revoluble frame or turret, two (or more) type-wheel shafts carried on said turret at some distance (about as shown) from the axis thereof, which shafts have each a type-wheel in the same plane, a starting-arm on one shaft at one height and another such arm on the other shaft at a different height, two (or more) sets of latches, one of the sets being so situated as to act on one arm only and the other latches to act on the other arm only, actuating devices for revolving and stopping said shafts after starting, and finger-keys and connections operatively connecting the keys and latches. These several elements are organized and arranged into substantially duplicate mechanisms in such manner that a stroke on one of the keys unhooks a latch, which, acting on one of the starting-arms to the exclusion of the other arm, sets in motion a particular one of the type-wheels, which wheel is revolved one (or more) times and is then stopped, having in the meantime printed the character corresponding to the key selected; and said organization is such that, some of the keys being connected with one set or tier of latches and other keys with the other tier of latches, either one of the type-shafts and its wheel may be selected and operated to the exclusion of the other (notwithstanding that both wheels are in the same plane) by simply selecting and striking keys of the corresponding set. Thus, by increasing the number of type shafts and wheels carried by the turret (each wheel having different characters) and the tiers of latches in like proportion, the machine may be adapted to the printing of a large number of characters without inconveniently increasing the size of or the number of characters on a single wheel.

The operative parts of the machine are supported by a frame-work, which I construct in two portions, comprising a box-shaped base or cabinet, B, and a circular machine-frame, D, resting thereon. The base consists of the bottom plate, 2, the side walls, 3 and 4, front 5, back 6, top plate, 7, and lower key-plate, 34. The front part of this plate 7 (at the right hand in Figs. 1 to 4, inclusive) serves as the key-board, having perforations for the keys in the base to project up through.

It is to be noted here that the numerals on the keys in Figs. 1, 4, and 25 to 32, inclusive, are not to be read as reference-characters.

The machine-frame proper is usually made of metal casting, and, as shown, consists of base 10, carrying the fixed stud 12, circular wall 14, carrying the rack or internal gear, 13, formed on or attached to said wall, and the upper and lower latch-frames, F and F', carried on frame D above gear 13, and hereinafter sometimes referred to without choice as "frame F" or "frames F," as the case may be, this being a mode of designation adopted also with reference to other substantially duplicate parts. Said upper and lower frames, F, are respectively furnished with a series of shaft-starting latches, P and R, and with some suitable accessory details for operating said latches. These parts in a preferred form will be particularly described in connection with Figs. 12 to 20, inclusive, which show a single latch and the tripping devices in successive positions. The frame F in these figures is supposed to be a part of one of the frames F in the general views, Figs. 1, 2, and 3, and this frame, together with the latch and accessory parts, is denominated the "latch mechanism," whose construction and operation are as follows: The latch-frame F is slotted or grooved to receive a sliding latch, 50, (which is the same as those designated by P and R, with index-marks,) held in place by cap 51. The latch is thrown forward (toward the right hand in Figs. 12, 13, 15, 16, 18, and 19) by a spring, 52, contained in the frame, and which acts through the sliding pin 53 against a projection, 54, formed on the latch, the motion of the latch being limited by some kind of stop, as 55, formed thereon and striking against a fixed part, as cap 51. The rear end of the latch has a spring, 56, terminating in a hook, 57, that normally engages with the notch or projection 58 on the frame, as shown in Figs. 12 and 18. When that hook is forced off from the notch, as in Figs. 15, 16, and 17, the spring 52 throws out the latch, as shown in these figures—that is, the hook has a principal and subordinate movement, the latter crosswise to the former.

For unhooking the latch I employ a tripping-rod, (guided in frame F at 69,) whose principal movement is in a vertical direction, and whose upper end is capable of a subordinate movement in two directions—horizontally with the motion of the latch and crosswise thereto. The tripping-rod consists, as shown in the principal figures of drawings, in a flat rod or wire, 60, twisted at 62, so that the part 60 stands crosswise to part 64, this being for the purpose of rendering the wedge-shaped upper end, 65, yielding in two directions, one of which is shown in Fig. 17 and the other in Fig. 19. The wedge 65 stands normally between hook 57 and incline 66, as in Figs. 12, 13, and 14. If, now, the tripping-rod be forced up, as in Figs. 15, 16, and 17, the incline forces off the wedge, and this acts against the hook to push it off notch 58, thereby permitting the latch to be thrown forward, as shown in these figures. The rod 60 may now be lowered, as in Fig. 14, and the latch be rehooked in its former position; but as the turret H is or may be continuously revolving it is possible and even probable that the latch will be returned by arm 26 (or 28) before the tripping-rod can be lowered, and to prevent this interfering with the rehooking of the latch the said rod is constructed and arranged to be pressed back by the latch, (by hook 57 thereof,) as shown in Figs. 18 and 19. By this means the finger-keys are so connected with the latches that one stroke on a key (properly limited by stops) can produce but one movement of the latch, cannot keep the latch unhooked, and thereby repeat the operations of the whole machine. This detachment between the key and latch is obviously of the highest importance in type-writing machines.

The latch mechanism above particularly described constitutes in part the subject-matter of and is claimed in a separate application, Serial No. 218,973. Said mechanism, however, is not the only one of its class adapted for use in connection with my present improvements, other mechanisms suitable therefor being described and claimed in my applications, Serial Nos. 221,926, 221,927, and 221,928, and in other applications to be filed.

The revolving shaft-carrying turret (designated in a general way by H) may properly comprise the sleeve 8 and the two pairs of arms 15 and 16 and 17 and 18. The sleeve fits freely on stud 12 and carries a gear, 9, whereby it is driven through gear 11 and shaft 19 from pulley 27. Other driving apparatus may, however, be employed. The arms 15 and 16 have formed in them, respectively, the lower and upper bearings for the type-wheel shaft 20, and the opposite arms, 17 and 18, have similar bearings for the similar shaft, 22. Each of these shafts, respectively, is furnished with a segmental type-wheel, 21 and 23, (both wheels being in the same plane,) with a corresponding segmental gear, 30 and 32, fixed thereon, and both meshing (when revolving) with the internal gear, 13, and with a stop-arm, 31 and 33, whose outer ends are turned down to form pins 29, which at the proper time (when the segmental gear turns out of mesh with the rack 13, which is concentric to the turret) during the operation of the machine strike against the segmental rim 24, and thus forcibly stop said shafts rotating. Arms 15 and 17 each have some detent device—as, for instance, the detent-pin 25, held up by springs and fitting suitable detent-notches in the gears 30 32—for the purpose of detaining the type-shafts 20 22 after these have been stopped rotating.

The types on the type-wheels correspond in number and circumferential position to the number and same position of the teeth on the segmental gear, so that when a particular type selected to be printed rolls against the paper on the paper-carriage the gear-tooth corresponding to said type will similarly roll in mesh with the internal gear or rack at a point in this rack which is substantially in line with and below the printing-point on said paper, and by placing the type-wheels on the extreme upper ends of their shafts the mechanism is practically all below the printing-line, so that the characters printed on the paper may be readily seen as soon as made, the rapid orbital movement of the type-wheels across in front of the paper not materially interfering with the clear discernment of the printing. Said type-shafts have also each a starting-arm, whose function is to engage with one of the latches P or R, and thus operate after the manner of a lever to start their respective shafts rotating, as fully shown and described in my aforesaid application, Serial No. 218,973; but for the purposes of my present improvements each of said shafts has its starting-arm located in a different plane of rotation, so that the arm 26 on shaft 20 engages with the upper tier of latches, P, while the similar arm 28, placed lower down on shaft 22, engages with the latches R of the lower tier. By means of this combination and arrangement of said parts either one of the wheels 21 23 may obviously be selected and operated to the exclusion of the other wheel. The same arrangement may be extended, a greater number of type shafts and wheels being used, and the tiers of shaft-starting latches increased accordingly.

The type-wheels 21 23 are together provided with ten types, five on each wheel, designated by the numbers 70 to 79, inclusive, the last figure of which numbers indicates the particular character printed by the respective types. Thus type 71 prints the numeral "1," and so on through the set. In a corresponding manner the index of the letters P and R indicates the numeral for the printing of which each particular latch is to be used. Thus latch $P^5$ is used to start the wheel 21 in proper time and manner to print the figure "5" and latch $R^3$ to print the figure "3," and so on through the list of numerals printed by the machine. Likewise the tripping-rods 60 connect the respective latches with corresponding sets of key-levers, which are designated by 40 to 49, inclusive, and through these levers with the keys 80 to 89, inclusive, the last figure of all which numbers designates the particular character for the printing of which said levers and keys are to be used. The set of keys, however, comprises more than ten, some (one or more) being duplicated, and these duplicates (distinguished by index-marks) interspersed among the other keys. Thus there are two keys 85, one being designated "85" and the other "85'," and three keys 80, designated "80," "80'," and "80''," all being scattered among the other keys in a manner to bring each character into juxtaposition with many other characters. All the keys for one character are connected by some convenient means to the corresponding lever for that character. Thus all the keys 80 are to be operatively connected to lever 40 (both numbers ending alike) and keys 86 to the lever 46. These connections may be conveniently and effectually made by means of rigid arms 90 to 99, inclusive, fixed in the respective keys and projecting first laterally and then downward until they rest on the proper levers. The construction and arrangement of said arms will be best understood from Figs. 4 to 11, inclusive. The keys have a vertical movement in plates 7 and 34, their stroke being properly limited by shoulders 35 and 36, Figs. 8 and 10, or by other stops not shown. They are uplifted by the key-levers, which rest on plates or bars 37 38, and are operated in one direction by springs 39. A similar plate, 38', is provided for the upper row of springs to react against. Pressing down a key rocks the lever on its supporting-plate against the pressure of spring 39 and throws up a tripping-rod, 60, to unhook a latch.

The material to be printed consists or may consist of a strip or ribbon, 100, of paper or the like. (See Figs. 1, 23, and 24.) This ribbon may be fed from a roll or the like (not shown) onto the drum 102, and held thereon by a roller, 120, said drum constituting in this case the paper-carriage of the machine. Said carriage is mounted on a shaft, 101, carried in bearings 103 104, which shaft has fixed thereon a ratchet-wheel, 105, for turning the same. Pivoted at 106 on frame D there is a double rock-arm, 107, operated in a backward direction by a spring, (not shown,) one end of which arm carries the feed-pawl 108, that meshes with the teeth of ratchet 105, and the other end of which arm, 109, is acted on by the feed-pins that (for convenience merely) are attached to gears 30 32. These pins are supposed to be numbered 110 to 119, inclusive, and to severally correspond, after the mode of designation above described, to the types 70 to 79, inclusive; but said pins are (to facilitate illustration) fully shown only in Figs. 21 to 24, inclusive, and since their mode of operation is always the same they are here shown on one gear only.

The operation of the machine is as follows:

It being required to print the numeral "7" on the ribbon, and the turret being properly revolving, the operator strikes one of the keys 87, and through this and the connections before described unhooks the latch P⁷, as shown at 50, Fig. 15. This latch then strikes the arm 26, and thus turns shaft 20, to bring the first tooth, 59, of gear 30 into mesh with teeth 13, which gearing then continues the motion of said shaft until the type 77 comes onto the carriage, as in Fig. 21, and makes its impression of a "7" on the material on said carriage. The turret passing on, as in Fig. 22, withdraws the type from the paper and brings the corresponding pin, 117, against the face 109 of rocker 107, and throwing this forward turns the ratchet and carriage forward ready for printing the next character. The operator next, let us suppose, strikes one of the keys 84. This in like manner unhooks latch P⁴, and results in bringing the last type, 74, of wheel 30 against the carriage, as in Fig. 23, thus printing a "4" after the "7" previously printed on strip 100; and the turret passing on, as before, brings pin 114 against arm 107, thereby again actuating pawl 108 to turn forward the carriage. In like manner any of the ten characters may be selected and printed; and by means of the duplication of keys described several characters may be caused to be printed by a single finger-stroke, as illustrated, for instance, in Figs. 25 to 33, inclusive. Thus in the stroke indicated by the dotted arrow $a$ in Fig. 25 the operator strikes first a key 83, then draws the finger over a key 88, and lastly over a key 80, thereby printing in succession the numerals "3," "8," and "0," forming the number "380;" and in like manner may be printed all the numbers given in the table, Fig. 33, together with many others not there set down. This mode of operating the keys may be extended to a greater number of them and to the printing of other and more numerous characters.

It will thus be seen from the preceding description that adjacent keys in the key-board (and in the same row of keys therein) may be connected to select successively types on separate type-wheels, and that any particular type on one wheel may be selected by a key next adjacent to another key, which may be connected to select any other particular type on the same or on the other wheel.

For feeding the carriage independently of the printing mechanism to make the spaces, as 121, between the numbers printed, (or between the words, if letters are printed,) I propose to use a separate device acting directly on the carriage; but as this device forms no part of the present invention and is not indispensable to its operation (since said carriage as herein shown to be constructed may be moved directly by hand) I have omitted such device from the drawings.

It will of course be understood that this machine, and especially the several mechanisms and details thereof, are capable of modification in various ways and degrees other than in the ways described, and after the manner of machines in general within the scope and limits of my invention.

Having thus described my invention, I claim—

1. The combination, in a type-writer, of a revoluble turret, two revoluble shafts carried on said turret, two tiers of shaft-starting latches, a starting-arm on the first shaft operated by one tier of latches, and a starting-arm on the second shaft operated by the other tier of latches, substantially as described.

2. The combination, in a type-writer, of a paper-carriage having a ratchet, the type-shaft carrying a type-wheel and having feed-pins corresponding to the types on said wheel, and feed devices, substantially as described, actuated by said pins and actuating said carriage, all substantially as set forth.

3. In a type-writer, the combination, with the printing mechanism, of a key-board having separate duplicate keys for the printing of one character, and these keys interspersed among the keys for other characters, all of said duplicate keys for the same character being operatively connected with said mechanism through a single connecting device, all substantially as described.

4. The combination, in a type-writer key-board, of perforated plates, as 7 and 34, a key, as 80, having a sliding movement in bearings in the plates, a key-lever, as 40, and the arm 90, projecting laterally from said key and resting on said lever, substantially as described.

5. The combination, in a type-writer, of a revoluble type-wheel having an orbital movement and provided with a starting-arm, and a series of independent reciprocating latches set alongside of the orbit of said type-wheel, each latch being constructed and located to properly start said wheel for the printing of a particular character, and said latches being each operated from a finger-key through a tripping-rod connected therewith, substantially as described.

6. The combination, in a type-writer having a revoluble turret carrying two revoluble type-wheels situated in the same plane, of substantially duplicate type-wheel-operating mechanisms, substantially as described, each mechanism operating one type-wheel to the exclusion of another wheel, substantially as described.

7. The combination, in a type-writer having a paper-carriage and a revoluble turret, of a revoluble shaft mounted on said turret at a distance from the axis thereof, a rack or internal gear concentric with said turret outside of said shaft, a segmental gear fixed on said shaft and adapted to mesh with said rack, and a segmental type-wheel fixed on said shaft and adapted to roll against said carriage, said type-wheel and gear corresponding in circumferential position on said shaft, and the types on said wheel corresponding to the teeth of the gear, substantially as described.

8. In a type-writer of the class described, the combination and arrangement, with the revoluble turret thereof having upper and lower bearings for a type-shaft at a distance from the axis of said turret, of the type-shaft journaled in said bearings, the starting-arm fixed on said shaft between said bearings, latches acting on said arm to start and revolve said shaft, and the type-wheel fixed on said shaft above said upper bearing, substantially as described.

9. In a type-writer, the combination of a printing mechanism having two revoluble type-wheel shafts carried on a revoluble turret, a shaft-starting arm on one shaft at one point and another starting-arm on the other shaft at another point longitudinally of said shafts, one series of starting-latches located to operate on one starting-arm and another series of starting-latches located to operate on the other starting-arm, (whereby one type-shaft may be started to the exclusion of the other shaft,) two tiers of key-levers, and connections from the first tier of levers to the latches of the first series of latches, respectively, and from the second tier of levers to the second series of latches, respectively, substantially as described.

10. In a type-writer, the combination of a printing mechanism having two revoluble type-shafts carried on a revoluble turret, a shaft-starting arm on each shaft and located, respectively, at different points longitudinally of said shafts, two series of shaft-starting latches located to operate on said arms, respectively, one set of key-levers connected to operate latches of one series of latches and another set of levers connected to operate latches of the other series of latches, and a key-board in which the several keys of one row of keys are connected some to one set of levers and some to the other set of levers, whereby one key in one row serves to start one type-shaft and an adjacent key in the same row of keys serves to start the other type-shaft, substantially as described.

FRANCIS H. RICHARDS.

Witnesses:
WILBUR M. STONE,
DARIEN W. DODSON.